(12) United States Patent
Kirk et al.

(10) Patent No.: US 9,037,392 B2
(45) Date of Patent: May 19, 2015

(54) AIRPORT SURFACE COLLISION-AVOIDANCE SYSTEM (ASCAS)

(71) Applicant: Honeywell International Inc., Morristown, NJ (US)

(72) Inventors: James Christopher Kirk, Clarksville, MD (US); Matej Dusik, Brno (CZ); Joseph Duval, Morristown, NJ (US); Jiri Vasek, Brno (CZ); Andrew Fannon Lamkin, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/742,688

(22) Filed: Jan. 16, 2013

(65) Prior Publication Data

US 2014/0081567 A1    Mar. 20, 2014

Related U.S. Application Data

(60) Provisional application No. 61/706,632, filed on Sep. 27, 2012.

(51) Int. Cl.
| | | |
|---|---|---|
| *G06F 17/10* | (2006.01) | |
| *G08G 5/06* | (2006.01) | |
| *G08G 5/04* | (2006.01) | |
| *G08G 5/00* | (2006.01) | |
| *G01S 13/93* | (2006.01) | |

(52) U.S. Cl.
CPC . *G08G 5/06* (2013.01); *G01S 13/93* (2013.01); *G08G 5/04* (2013.01); *G08G 5/0021* (2013.01); *G08G 5/065* (2013.01)

(58) Field of Classification Search
CPC ..... G08G 5/065; G08G 5/0021; B64D 47/04; G01S 13/93

USPC ............. 701/3, 5, 13, 17, 36, 301; 244/158.1, 244/180; 340/901, 903, 945, 961
See application file for complete search history.

(56) References Cited

U.S. PATENT DOCUMENTS

| | | | |
|---|---|---|---|
| 6,118,401 | A | 9/2000 | Tognazzini |
| 2005/0171654 | A1 | 8/2005 | Nichols et al. |
| 2006/0255969 | A1 | 11/2006 | Sakakibara |
| 2010/0123599 | A1 | 5/2010 | Hamza et al. |
| 2010/0258628 | A1* | 10/2010 | Bay ............................... 235/404 |
| 2011/0001825 | A1 | 1/2011 | Hahn |

OTHER PUBLICATIONS

International Search Report and Written Opinion from counterpart International Application No. PCT/US2013/043220, dated Aug. 27, 2013. 11 pp.

* cited by examiner

*Primary Examiner* — Gertrude Arthur Jeanglaude
(74) *Attorney, Agent, or Firm* — Shumaker & Sieffert, P.A.

(57) ABSTRACT

Systems and methods for performing airport surface collision-avoidance. A wingtip-mounted camera allows the pilot to positively ascertain that the wingtip will clear objects located in the video. An exemplary system implemented on an aircraft includes a wingtip module having a camera that generates a video stream and a communication device that transmits the generated video stream. A processor receives the video stream and generates a reticule for the video stream. A display device simultaneously presents the video stream and the reticule. The reticule includes a horizon line and is based on a focal length of a lens of the camera and height of the camera above ground. The reticule includes curved and/or straight distance lines and curved or straight travel lines. The travel line(s) correspond to at least one aircraft component or a zone of importance and are based on location of the camera and trajectory of the aircraft.

20 Claims, 4 Drawing Sheets

US 9,037,392 B2

AIRPORT SURFACE COLLISION-AVOIDANCE SYSTEM (ASCAS)

PRIORITY CLAIM

This application claims the benefit of U.S. Provisional Application Serial No. 61/706,632, filed Sep. 27, 2012, the content of which is incorporated herein by reference. The entire content of U.S. Provisional Application Serial No. 61/653,297, filed May 30, 2012, is also incorporated by reference herein.

BACKGROUND OF THE INVENTION

Extensive monetary damage and potential human injury are experienced each year due to the collision of large aircraft wingtips with ground facilities and other aircraft. The principal reason for these collisions appears to be the pilot misjudging the clearance distance available for the passage of the wingtip when operating in tight quarters or in unfamiliar facilities.

Cameras have been used on aircraft in various locations, including wingtips, for this sort of application before. However, the lack of depth perception inherent in a two-dimensional camera display cannot reliably provide the pilot with clearance information.

SUMMARY OF THE INVENTION

The present invention provides systems and methods for performing airport surface collision-avoidance. A wingtip-mounted camera allows the pilot to positively ascertain that the wingtip will clear objects located in the video. An exemplary system implemented on an aircraft includes a wingtip module having a camera that generates a video stream and a communication device that transmits the generated video stream. A processor receives the video stream and generates a reticle for the video stream. A display device simultaneously presents the video stream and the reticle.

In one aspect of the invention, the reticle is based on a focal length of a lens of the camera and height of the camera above the ground.

In another aspect of the invention, the reticle includes a horizon line.

In still another aspect of the invention, the wingtip module includes a navigation light and/or a collision light.

In yet another aspect of the invention, the wingtip module includes an eye-safe laser that generates an eye-safe laser beam. The eye-safe laser directs the laser beam in a direction approximately parallel to a longitudinal axis of the aircraft fuselage.

In still yet another aspect of the invention, the reticle includes curved and/or straight distance lines.

In a further aspect of the invention, the reticle includes at least one curved or straight travel line. The travel line corresponds to at least one aircraft component or a zone of importance. The travel line is based on the location(s) of the camera(s) and the trajectory of the aircraft.

BRIEF DESCRIPTION OF THE DRAWINGS

Preferred and alternative embodiments of the present invention are described in detail below, with reference to the following drawings.

DETAILED DESCRIPTION OF THE INVENTION

Figure 1:
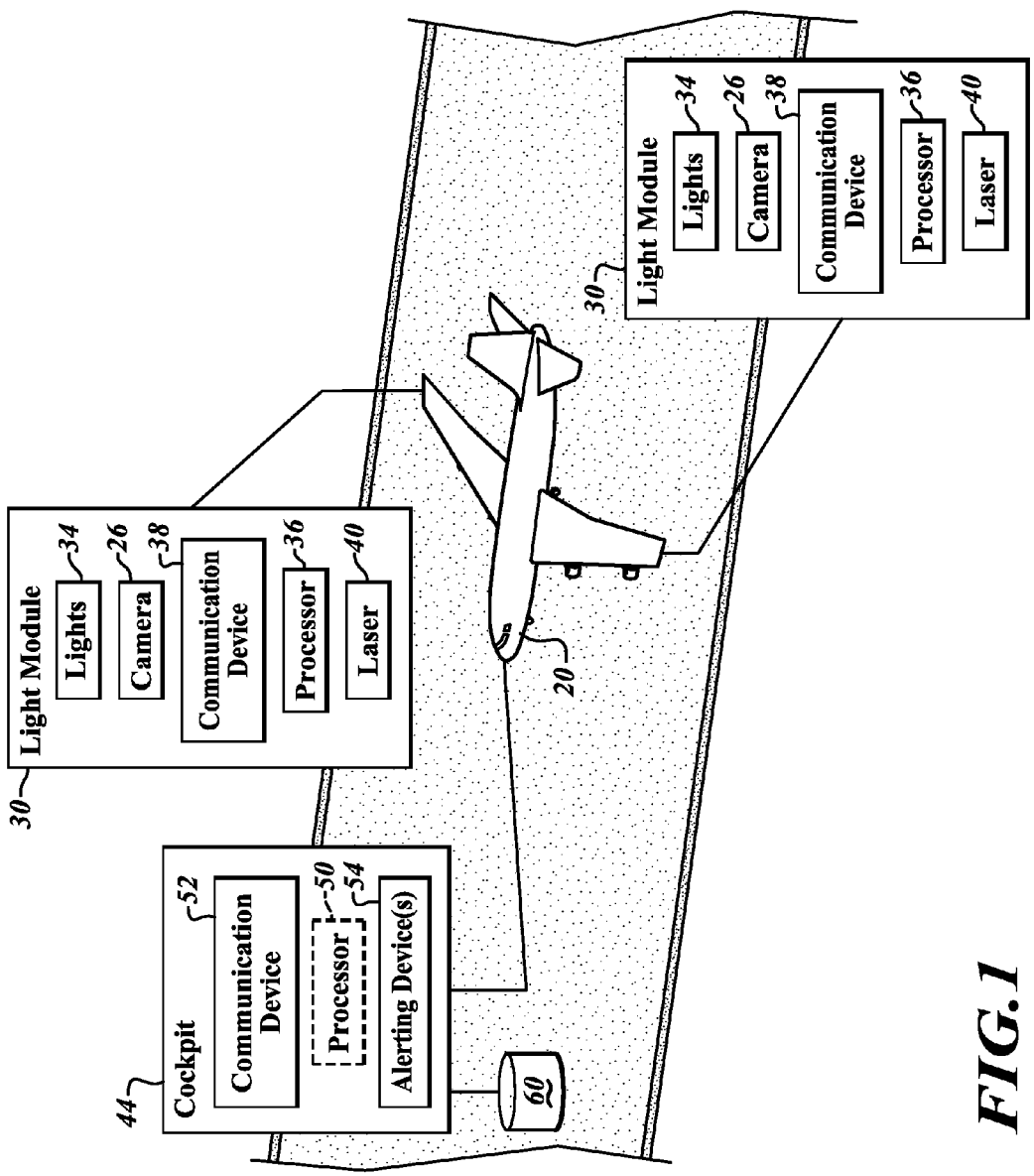
FIG. 1 is a diagram of an exemplary system formed in accordance with an embodiment of the present invention.

In one embodiment, as shown in FIG. 1, an aircraft 20 includes cameras 26 that are incorporated within wingtip-mounted aircraft light modules 30 or located at other parts of the aircraft 20. The light modules 30 also include navigation/position lights 34, a processor 36 (optional), a communication device 38, and a laser (optional) 40. The cameras 26 are in communication (wired or wirelessly) with a user interface (UI) device 44 via the communication device 38.

The UI device 44 includes a processor 50 (optional), a communication device (wired or wireless) 52, and a display device 54. The UI device 44 provides visual presentations that include the video generated by the cameras with reference information (e.g., a reticle).

In one embodiment, the camera 26 includes a microcamera located at the wingtip within the light module 30 that includes the lights 34 (e.g., LED lights), which occupy less space than traditional aircraft navigation lights. The camera 26 is aimed along an axis parallel (coaxial) to the fuselage of the aircraft (i.e., longitudinal axis of the fuselage). The cockpit display 54 is part of the aircraft's flight systems, an adjunct device, or an electronic flight bag (EFB) application. The processor 36 or 50 adds a reference reticle to each camera video. The reference reticle permits the pilot to easily see the wingtips' location relative to obstacles visible in the camera video.

In one embodiment, the camera 26 is a day/night camera. The camera 26 may also be an infrared camera that is sensitive to the laser 40 that presents a line on the ground beneath the aircraft 20. The presented line marks the outer travel limit of the wingtip. The laser 40 is an eye-safe device. This eye-safe laser line is invisible to the naked eye, can only be seen by the camera, and is visible to the camera even in bright daylight.

In one embodiment, the pilot uses night-vision goggles (NVGs) to see the laser beam on the ground. In one embodiment, the cameras 26 are omitted and operation is based on using NVGs to spot the laser beam produced from the wingtip alone.

In one embodiment, a single camera is placed in the tail position with lasers placed in the wingtip light modules. The single tail camera provides a view from the tail that clearly indicates both wings at once and spots the beams produced by the lasers.

Figure 2:
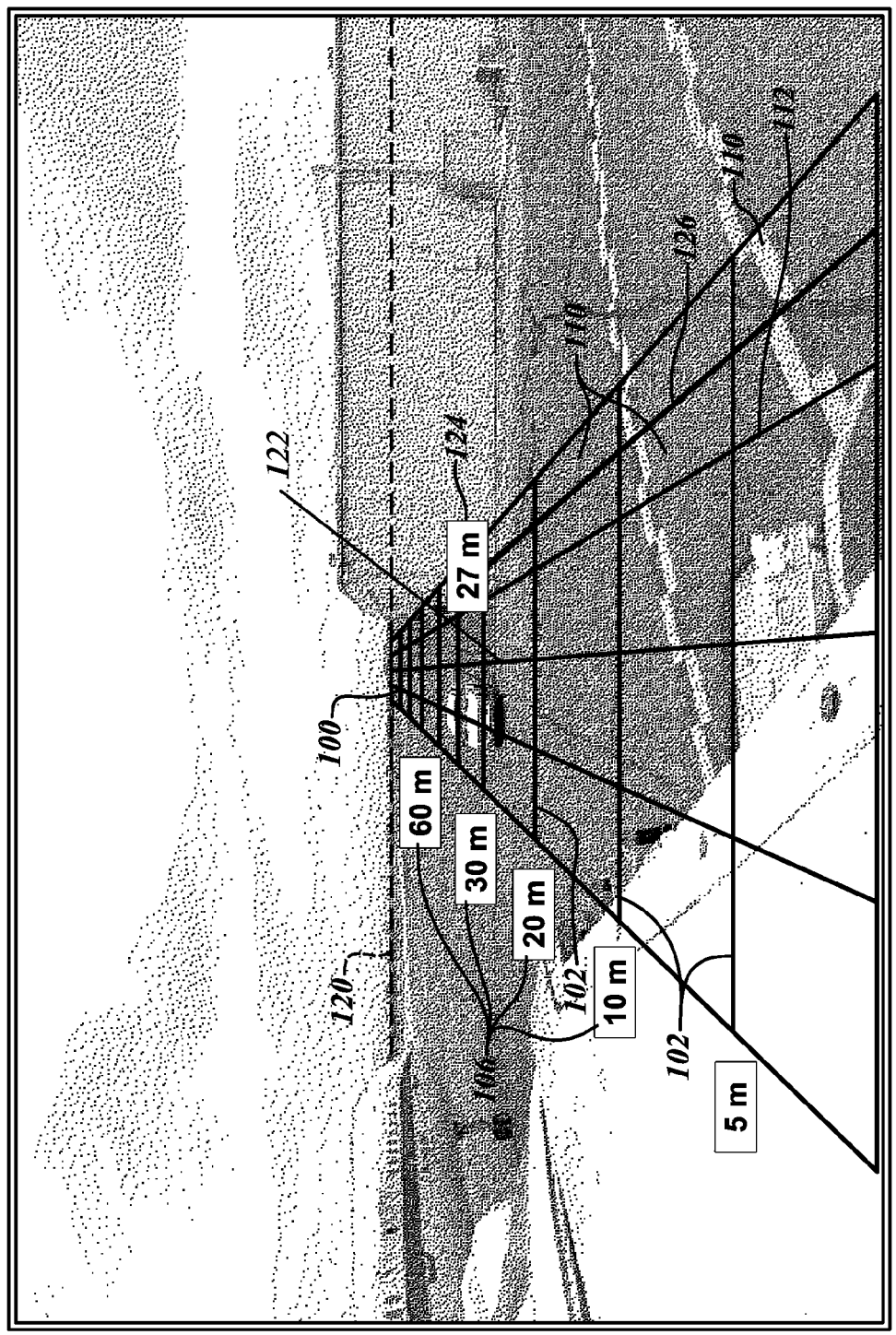
FIGS. 2-4 are combined camera and reticle images generated by the system shown in FIG. 1.

FIG. 2 shows an example of a reticle 100 overlaid onto a starboard wingtip-mounted camera image 98. The reticle 100 includes an "avoidance grid" that is generated by the processor 36 or 50 or predetermined, prior to operation, based on the previously known optical properties of the camera (i.e., height above the ground, lens focal length). The reticle 100 can be generated by a processor in the camera or by another processor located in the aircraft.

The reticle 100 and a horizon (or height of wing) line 120 are determined according to the focal length of the lens on the camera 26 and height of the camera 26 (i.e., lens) above the ground. If an object does not rise above the horizon, or at least approach it sufficiently to raise concern, then the object will pass below the wing (or above it). This permits the pilot to ignore objects too short for it to collide with such as service vehicles.

The reticle 100 includes lines 112, 122, 126 and others that extend from a near part of the video and converge toward the horizon line 120. The lines 112, 122, 126 are approximately parallel to the centerline of the aircraft's fuselage. The line 112 corresponds to the end of the wingtip (i.e., wingtip travel line). An area 110 is shaded in order to indicate the area outside the lateral dimension of the wingtip. The line 122 is a reference line for the boresight of the camera. The line 126 is a safety buffer line. In one embodiment, the line 126 indicates a location about 3 meters from the wingtip. The reticule 100 also includes distance lines 102 with their associated distance value identifiers 106.

In this example, a building 128 has been identified to be the closest target within the reticule 100 at 27 meters. A target distance marker 124 is presented approximately where the associated object is located relative to the reticule 100. In one embodiment, the processor 50 performs image analysis to identify an object in the video that would be considered a target.

The present invention provides different UI devices for different stakeholders, through electronic flight bag (EFB)/primary flight display (PFD)/multifunction display (MFD)/navigation display to pilots, EFB/headset to tug drivers, headset to wing-walkers, etc. The display system can be either the aircraft integrated flight management system or an augmentation approach such as incorporation into a tablet computer-based Electronic Flight Book.

Figure 3:
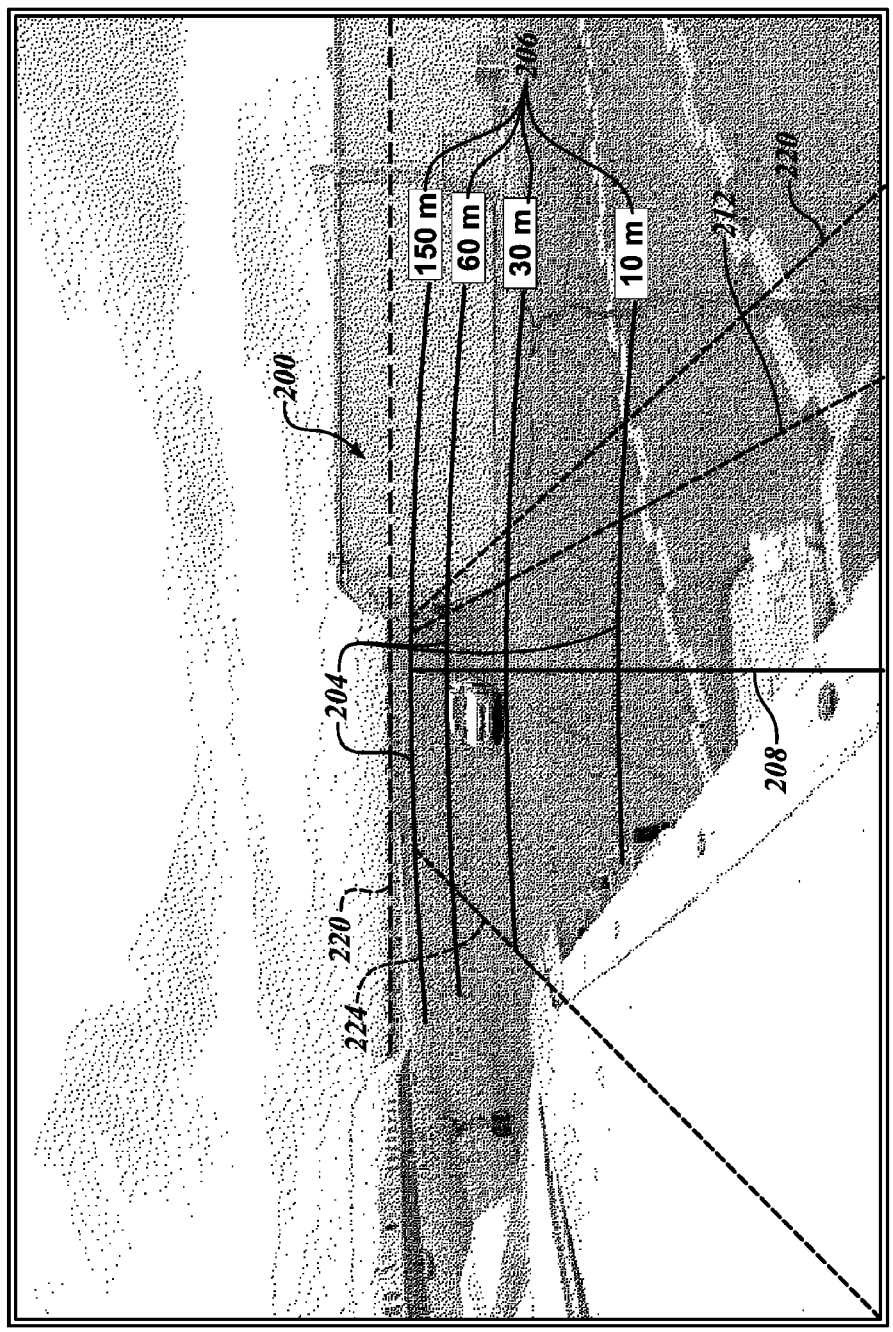

FIG. 3 shows a wingtip camera image 198 with a reticule 200 superimposed thereon. The reticule 200 is generated (e.g., by the processor 36, 50) based on the height of the corresponding camera 26 and focal point of the camera 26. The reticule 200 includes a horizon line 220, curved range lines 204 with distance markers 206, and a camera boresight line 208 (i.e., line of camera travel). The camera boresight line 208 begins from a camera-mounting location relative to the image 198. The reticule 200 also includes a wingtip travel line (WTL) 212 that starts from the wingtip, relative to the image 198. The WTL 212 illustrates wingtip travel, provided that the corresponding aircraft remains on a current heading.

In one embodiment, the reticule 200 includes an exclusion zone line (EZ) 210 that identifies a boundary of a buffer zone. The EZ 210 is an advisory to the pilot to keep objects outside the buffer zone.

In one embodiment, the reticule 200 includes an engine (or other wing-mounted object) nacelle travel line (NTL) 224. The NTL 224 shows the line of travel of an engine nacelle mounted below the wing. The camera boresight line 208, the WTL 212, the EZ 210, and the NTL 224 are parallel to a longitudinal axis of the aircraft fuselage.

Figure 4:
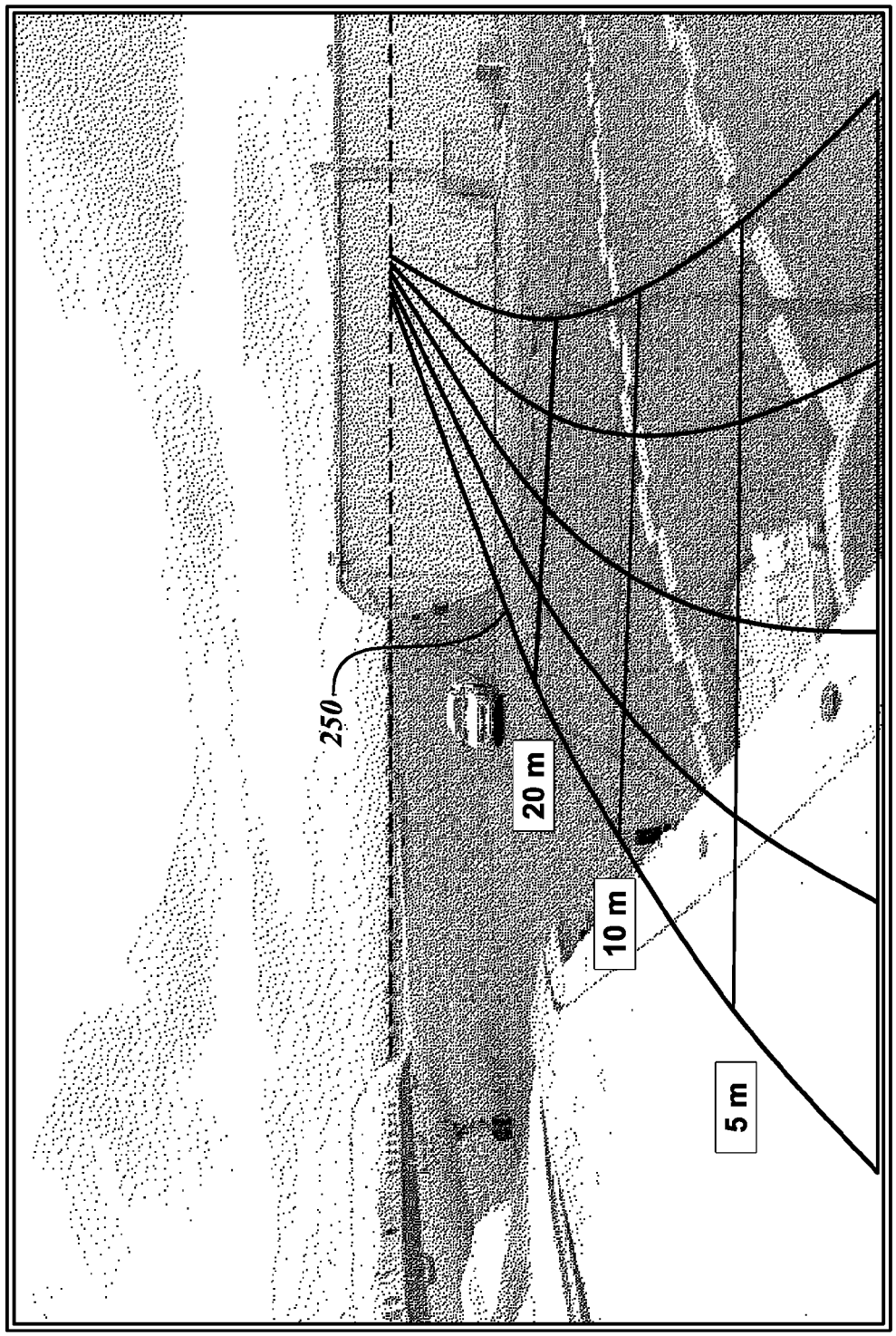

In one embodiment, as shown in FIG. 4, the processor 36, 50 generates a reticule 250 based on information (e.g., ground speed, heading, etc.) received from other aircraft system(s) (such as a global positioning system (GPS)) and geometric information stored in the database 60 to determine trajectory of aircraft components of interest (e.g., engine nacelle, camera, wingtip, etc.). The processor 36, 50 uses the determined trajectory information to dynamically generate the reticule 250. Thus, as shown, the reticule 250 is curved because the processor 36, 50 has determined that the aircraft is turning to the right.

In one embodiment, a cockpit antenna is included in a central handheld unit that includes a radio receiver. In one embodiment, the antenna resides in the cockpit and is located in a position most favoring signal reception from all communication devices.

In one embodiment, an antenna is mounted on a roof of the cockpit. This position provides direct visibility from all communication devices.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system comprising:
   at least one wingtip module configured to be mounted on a wing of an aircraft, the wingtip module comprising:
      at least one camera configured to generate a video stream; and
      a communication device configured to receive and transmit the generated video stream;
   a processor configured to:
      receive the video stream from the communication device, and
      generate a reticule for the video stream, wherein the reticule provides a reference for determining a location of a wingtip of the wing relative to obstacles visible in the video stream; and
   a display device configured to simultaneously present the video stream and the reticule.

2. The system of claim 1, wherein the processor generates the reticule based on a focal length of a lens of the camera.

3. The system of claim 2, wherein the processor generates the reticule further based on the height of the camera above the ground.

4. The system of claim 3, wherein the reticule comprises a horizon line.

5. The system of claim 1, wherein the wingtip module comprises at least one of a navigation or collision light.

6. The system of claim 1, wherein the wingtip module further comprises an eye-safe laser configured to generate an eye-safe laser beam, and wherein the eye-safe laser directs the laser beam in a direction approximately parallel to a longitudinal axis of a fuselage of the aircraft.

7. The system of claim 1, wherein the reticule comprises at least one of curved or straight distance lines.

8. The system of claim 1, wherein the reticule comprises at least one travel line, wherein the at least one travel line corresponds to at least one aircraft component.

9. The system of claim 1, further comprising an aircraft system configured to identify trajectory of the aircraft, wherein the processor is further configured to generate at least a portion of the reticule, based on the location of the camera and the identified trajectory.

10. The system of claim 1, wherein the processor is configured to generate the reticule based on a ground speed and a heading of the aircraft.

11. A method comprising:
   generating, by a camera located in a wingtip module located at least near a wingtip of an aircraft, a video stream directed along a forward motion of travel of the aircraft;
   wirelessly transmitting, by a communication device located in the wingtip module, the generated video stream;
   receiving, by a processor, the video stream from the communication device; and
   generating, by the processor, a reticule for the video stream, wherein the reticule provide a reference for determining a location of the wingtip relative to obstacles visible in the video stream; and
   at a display device, simultaneously presenting the video stream and the reticule.

12. The method of claim 11, wherein generating the reticule comprises generating the reticule based on a focal length of a lens of the camera.

13. The method of claim 12, wherein generating the reticule further comprises generating the reticule based on the height of the camera above the ground.

14. The method of claim 13, wherein the reticule comprises a horizon line.

15. The method of claim 11, further comprising providing, by at least one of a navigation or collision light included in the wingtip module, an illumination.

16. The method of claim 11, further comprising generating, by an eye-safe laser included in the wingtip module, an eye-safe laser beam that is directed in a direction approximately parallel to a longitudinal axis of a fuselage of the aircraft.

17. The method of claim 11, wherein the reticule comprises at least one of curved or straight distance lines.

18. The method of claim 11, wherein the reticule comprises at least one travel line, wherein the at least one travel line corresponds to at least one aircraft component.

19. The method of claim 11, further comprising determining, by an aircraft system, a trajectory of the aircraft, wherein generating the reticule comprises generating at least a portion of the reticule based on the location of the camera and the identified trajectory.

20. The method of claim 11, wherein generating the reticule for the video stream comprises generating, by the processor, the reticule based on a ground speed and a heading of the aircraft.

\* \* \* \* \*